Feb. 1, 1966     D. L. HENDERSON     3,231,896
WELDING HELMET

Filed June 29, 1964     2 Sheets-Sheet 1

DAVID L. HENDERSON
INVENTOR.

BY *Ely Silverman*
ATTORNEY

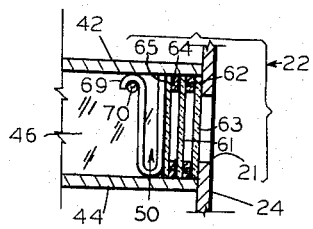
FIG.4
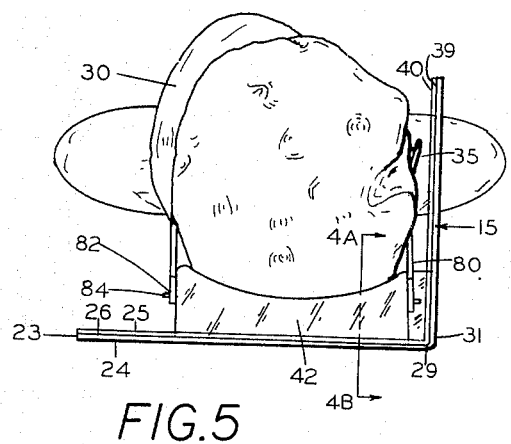
FIG.5
FIG.6
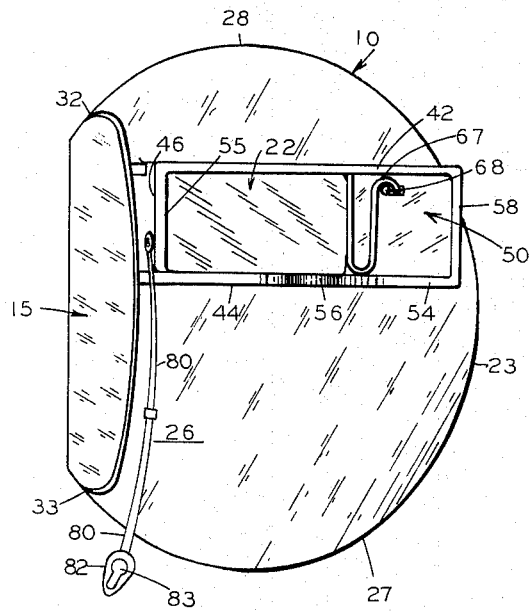
FIG.7
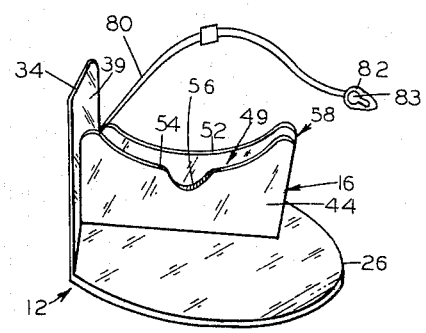
DAVID L. HENDERSON
INVENTOR.
BY Ely Silverman
ATTORNEY

United States Patent Office 3,231,896
Patented Feb. 1, 1966

3,231,896
WELDING HELMET
David L. Henderson, Box 458, Stinnett, Tex.
Filed June 29, 1964, Ser. No. 378,890
5 Claims. (Cl. 2—8)

This invention relates to an improved welder's helmet.

While it is customary for torch welders to employ shields or helmets for protecting the neck, face and head, where several welders are working in any one room, the light rays from other torches may enter the sides of some helmets from the rear or top and cause damage to the eyesight of the operators wearing such helmets.

Other headpiece protectors or helmets have attempted to provide a complete shielding of the head of the operator, yet such hoods produce a feeling of stuffiness resulting from that the wearer's escaping breath is constrained to flow into a restricted area which usually adds to the discomfort of the operator, whereas for comfort it is essential that fresh air shall be enabled to have free access to the space between the wearer's face and the inside surface of the protector.

Further, welding masks conventionally are heavy: this invites the welder to use helmets with movable components for the viewing window thereof as in United States Patents Nos. 1,861,797 and 2,086,208. The appeal of this type of helmet is premised on the extremely heavy weight or inconvenience of moving a conventional welding helmet and, accordingly, the desirability of moving only a very light portion of the eye-shield. The fallacy of such apparatuses is in that when, because of mechanical or human failures, they fail to operate, the welder's eyes are subject to the glare of the welding operation.

Accordingly, this invention provides an apparatus wherein the viewing window is fixedly attached to the apparatus and the entire apparatus is sufficiently light for the entire apparatus to be conveniently and readily moved up and down from and to the operator's head and eyes so that when the operator is ready to begin operations, there is no question but that his eyeshield will be operative and will continue so because it is no burden to the operator to wear it. Many accidents occur simply because the welder doesn't wear his shield, while the apparatus of this invention provides a welding helmet which is sufficiently light and with the usual inconvenience in ventilation and weight usually attributed to these apparatuses avoided so that the helmet is readily and properly worn whenever needed.

One object of this invention is to provide a welding helmet which effectively protects the welder.

Another object of this invention is to provide a welding helmet that is comfortable to use.

Yet another object of this invention is to provide a welder's shield which is readily and conveniently taken out of operative position and readily moved into operative position.

These and other objects of this invention will be apparent to those skilled in the art on the study of the below specification and drawings, which drawings form a part of this specification and wherein like numbers refer to like parts throughout and wherein, FIGURE 1 is a side and perspective view of one embodiment of apparatus according to this invention;

FIGURE 4 is a sectional view along plane 4A–4B of FIGURE 5;

FIGURE 5 is a top view of the apparatus of FIGURE 1 as worn and shown in FIGURE 2;

FIGURE 6 is a rear view of the apparatus of FIGURE 1; and

FIGURE 7 is a perspective view looking upwardly and forwardly of the apparatus of FIGURE 1 in the direction shown by arrow 7A of FIGURE 2.

Figure 1:
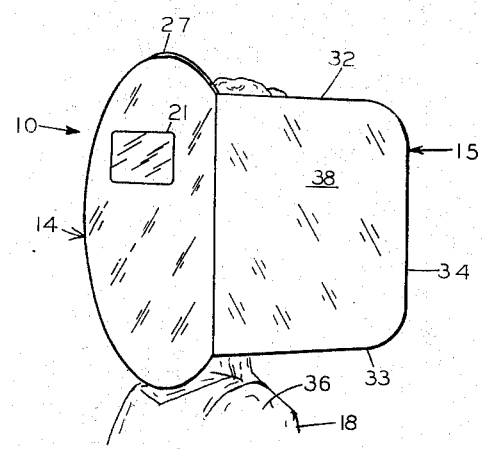

The apparatus 10 is worn on the head of a welding operator 18. The operator is shown wearing a conventional cloth cap 19 with a visor 30, the visor 30 being worn over the right ear and neck of the wearer when the helmet 10 is used.

The apparatus generally referred to as 10, of this invention and shown in FIGURES 1–7, comprises a plate subassembly 12 and a bridging subassembly 16.

The plate subassembly 12 comprises a rigid front plate 14 and a rigid side plate 15 firmly joined together. The front plate 14 is held to the side plate 15 through the bridging assembly 16. One edge of the bridging assembly 16 is attached to plate 14 and another adjacent edge thereof is attached to the plate 15. The front plate 14 comprises a rigid flat opaque plate with an aperture 21 therein. Plate 14 is circular in outline in the preferred embodiment and imperforate except for the aperture 21 therein for the window subassembly 22. The window subassembly 22 is located in major part in the bridging subassembly 16.

The plate 14 is 1/16-inch thick, polymerized methyl methacrylate sheet. The front surface 24 of the sheet 14 is extremely smooth, highly polished and highly reflective. More particularly, it has a mirror finish and, in the preferred embodiment, is white in color to increase its reflectivity. Subassembly 22 does not project beyond the front surface 24; this permits the entire apparatus 10 to be laid on a flat floor, face down, without harming the glass. The rear surface 26 of the plate 14 is black and dull for maximum absorption of radiation. In the preferred embodiment plate 14 also comprises a 1/8-inch thick layer 25 of polymerized polyvinyl chloride plastic foam which is insulating and non-inflammable and firmly attached to the surface 26.

The side plate 15 is a rigid flat plate. It is attached at its front end 31 to plate 12 and forms a continuous surface therewith. The plate 14 has an upper edge 32, a lower edge 33 and a rear edge 34. The outer surface 38 of the plate 14 is highly reflective and also white as is the front surface 24 of the plate 14. The inner surface 39 is dull and rough, like surface 26.

A layer 40 is firmly fixed to the inner surface 39 of plate 14. Layer 40 is an insulating and radiation-absorbing foam structurally identical to layer 25, and fixed to surface 39 in the same manner layer 25 is fixed to surface 26; i.e., by a thermosetting cement in the preferred embodiment.

The left edge 29 of plate 14 extends to beyond the left side of the left ear of the right-handed welder 18 sufficiently that there is a space of one to two inches between the left side 35 of the left ear of the operator 18 and the inner surface of plate 15.

The bridging subassembly 16 generally comprises a hollow conduit which serves to support subassembly 12 with plate 14 spaced away from the face of the wearer, to hold a window plate subassembly 22, and to protect the eyes of the operator 18 from thermal mechanical and optical injury and from the sparks arriving for whatever reason on the rear side of plate 14.

The subassembly 16 provides for holding the plate 14 generally at least one inch away from the nose of the wearer, and with the plate 15 spaced away from the left side of the left ear of the wearer.

The subassembly 16 comprises an upper wall 42, a lower wall 44, a left side wall 46, and a right side wall 48. Each of these walls is made of balsa wood about ⅜-inch thick in the preferred embodiment. These walls are rigid and are of excellent insulating characteristics; a foam plastic, noninflammable, as a vinyl polymer, could also be used therefor. The bottoms of the left portion of walls 42 and 44 are firmly joined to the top of wall 46, the right edges of walls 42 and 44 are firmly joined to the top of wall 48. The rear edge 52 of upper wall 42 is curved to generally fit the contour of the forehead of the welder 18.

Walls 42, 44 and 48 extend from the head of the wearer to the rear surface 24 of the plate 14 to which they are firmly attached. The left ends of walls 42 and 44 are firmly attached to the right surface 39 of the plate 15.

The walls 42, 44, 46, and 48 define a chamber 50 which is light-tight except at its ends. The chamber 50 extends from it open rear end 49 to aperture 21. The aperture 21 entirely opens into the front end of chamber 21. The window plate subassembly 22 is located in the front end of chamber 50.

The subassembly 22 comprises a filter 61, a cover glass 63, an auxiliary glass 65, gaskets, springs 67 and 69, and the front end of chamber 50. Filter 61 is a conventional sheet of transparent material which absorbs infrared rays, ultraviolet rays and part of the visible rays that emanate from the molten metal or arc with which the welding operator works. The front end of the upper and lower and side members forming chamber 50 circumscribe the upper and lower and side edges of the rectangular filter glass 61 and protective sheet or glass 63. The protective sheet or glass 63 is provided on the outer side of the filter glass 61 so as to protect it from flying particles of metal and sparks. Thus, if the protective sheet or glass 63 is damaged by any flying particles or metal or oxide, it is feasible to replace the damaged protective glass: the subassembly 22 is arranged in subassembly 16 so that this may be readily accomplished. A cork gasket 62 is located between the outer edges of glasses 61 and 63. A similar cork gasket 64 is located between the outer edges of glass 61 and a rear protective transparent glass 65. The front sheet or glass 63 may be an alkyl resin as in United States Patent 2,056,027. A U-shaped spring 67 is located on the right side of sheet or glass 65 and resiliently abuts against a pin 68 firmly located on wall 46. A similar U-shaped spring 69 is located on the left side of sheet 65 and resiliently abuts against a firmly located pin 70 in wall 46. The springs 69 and 67 are readily removed when it is desired to remove the equisized plates or sheets 63, 65 and 67 and are readily replaced. The chamber 50 has a rectangular cross-section as measured in a plane parallel to plate 14 slightly larger than the rectangular glasses or sheets 63, 65 and 67. The orifice 21 is slightly smaller than each of the elements 63, 65 and 67. Hence, the springs 67 and 69 hold the elements 63, 65 and 67 firmly yet resiliently and replaceably in place at the front end of chamber 50. The walls 42, 44, 46 and 48 of chamber 50 are joined to each other and to surface 26 with firm and light-tight points. All the interior surfaces of the walls forming chamber 50 are black and dull. The rear edge 54 of wall 44 is curved to fit the cheekbones of the wearer and has a cut-away V-shaped portion for the nose of the wearer. The portion 56 is cut away substantially larger than the expected size of any normal nose in order that the weight of the apparatus 10 is borne by the cheekbones of the wearer and not by nosebone. An adjustable elastic band 80 is attached to and extends from a fixed point on the outer surface of the rear end of wall 46 midway between walls 42 and 44 to a slotted band plate 82. Plate 82 has a slot 83. The slot 83 is releasably attached to a pin 84 on the rear end of wall 48 midway between walls 42 and 44 on the outer surface of wall 48. The distance from the curved edge 52 to surface 26, and the distance from curved edge 54 to surface 26 are the same. The radius of curvature of edges 52 and 54 is the same. The rear edges 55 and 58 of walls 46 and 48 extend rearwardly of the eyes of the operator 18, but not as far as the ears. The band 80 passes rearwardly and downwardly below the downwardly and forwardly sloped portion of the rear of the skull of the operator and past the upper tips of the ears of the operator 18. The walls 42, 44 and 46 are firmly joined to the plate 14 and to the plate 15 and provide a rigid angle therebetween which keeps those plates in a fixed and rigid relation to each other. The chamber 50 between the walls 42, 44, 46 and 48 provides an empty space for the eyes 75 of the wearer 18 to see through the aperture 21.

The rear edges 52, 54, 55 and 58 of members 42, 44, 46 and 48, respectively, have a soft and flexible rubber lining where such edges make direct contact and a light-tight seal with the face of the operator.

The lower edge 27 of the plate 14 extends downward to the collarbone of the wearer. Other clothing normally worn shown as 36, such as overalls, shirt, or a leather vest extends up to the height of the operator's collarbone. A substantial space 85 between the back of plate 14 and the operator's face is thus available for movement of air to and from the operator's nostrils. The space is open at its bottom and at its right side adjacent right edge 23 of plate 14. The apparatus 10 also provides for spacing away the inner surface 39 of plate 15 from the left ear of the operator. This not only provides for protection of that ear from direct contact with the plate 15 but also facilitates the operator's hearing as such ear is open to the space between the plate 15 and the operator's head and that space is directly open to the space surrounding the top and rear of the helmet 10.

In a preferred embodiment of apparatus according to this invention the dimensions of the apparatus 10 and its components are as given in Table I.

The front and outer surfaces 24 and 38 each have a mirror polish and a smooth surface and are preferably of white color to improve their reflectivity. The rear and inner surfaces 26 and 39 may be readily ribbed to improve their rigidity.

It is to be noted that, in the preferred embodiment, the cap has a visor 30, which visor goes over the right ear of the right-handed operator while the plate 15 protects the left ear.

Most welders who are right handed tend to start their flame and provide their sparks off at the left-hand side and the reflective surface 38 provides protection against this glare and heat. A short skirt 77 may be provided at the bottom of plate 14 to provide additional mechanical protection to the neck of the welder without interfering with ventilation.

The distance of the welding flame from the welder's face is usually sufficient so there is no serious problem due to direct heating by convective currents by the flame

TABLE I

*Dimensions of apparatus of FIGURES 1–7*

| Item | Dimension from/to | Size, color, wt. or material |
|---|---|---|
| Plate 14: | | |
| Height | 27/28 | 10½″. |
| Width | 23/29 | 9″. |
| Thickness | 24/26 | 1/16″. |
| Color | 24 | White. |
| Color | 26 | Black. |
| Material | | Methyl methacrylate polymerized [1] |
| Aperture 21, height | | 1½″. |
| Aperture 21, width | | 3⅝″. |
| Plate 15: | | |
| Height | 32/33 | 7¼″. |
| Width | 29/34 | 5½″. |
| Thickness | 39/38 | 1/16″. |
| Color | 39 | White. |
| Color | 38 | Black. |
| Subassembly 16: | | |
| Width | [2] 48/46 | 5¾″. |
| Height | [2] 44/42 | 2⅝″. |
| Members 42, 44, 46, 48, thickness | | ⅜″. |
| Members 42, 44, 46, 48, material | | Balsa wood. |
| Edge 52, curvature radius of curvature | | 2¼″. |
| Edge 52, depth | [3] 26/52 | 2¾″. |
| Edge 52, depth | [4] 26/52 | 1¼″. |
| Apparatus 10, overall weight (with glass) | | 9 oz. |
| Apparatus 10, overall weight (without glass) | | 6 oz. |
| Aperture 21, vertical location, top edge | 21/28 | 3″. |
| Aperture 21, vertical location, left edge | 21/29 | 2¼″. |

[1] May be fiberglass.  [2] Outer.  [3] Maximum.  [4] Minimum.

of the welding arc to the mask. The best insulation available is the air space 85 between the welder's mask and the welder's face. Accordingly, the fire-resistant welding hood provides sufficient heat protection. Further, the free access of air to the nose of the wearer facilitates breathing and comfort during operation. The item requiring protection is the welder's eyes and the ears, and the cap goes over one ear, the surface 15 goes over the other. The apparatus is sufficiently light that there is no question of the operator always wearing a mask under all situations, even starting the flame, etc., while, with heavier masks, the mask simply is not used when it should be used, while with the apparatus of this invention, the apparatus is used at all times when it is desired to be used as it weighs so little, and accordingly, although effective, is no inconvenience to be carried around by the operator and immediately available.

Figure 2:
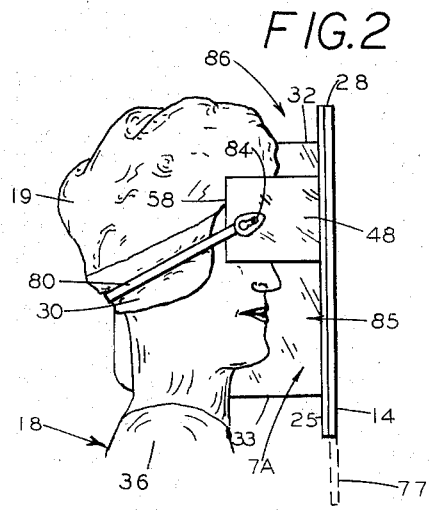
FIGURE 2 is a right side view of the apparatus of FIGURE 1 and showing it in the position as worn by an operator.
Figure 3:
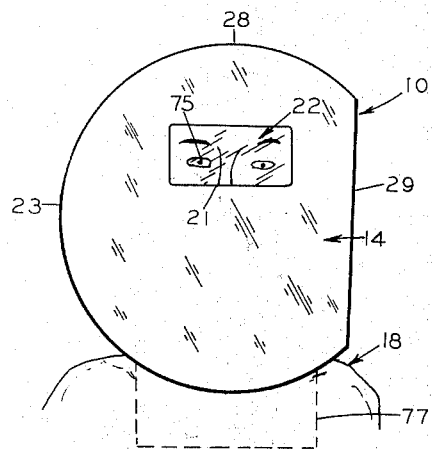
FIGURE 3 is a front view of the apparatus shown in FIGURE 1.

The insulating bridging subassembly 16 provides for that when sparks come toward the operator's head they are shed by the cap 19, fall to the top wall 42 and are readily shaken off without damage to the wearer. The position of the headband 80 pivots the apparatus 10 on the surface 56 about the cheekbone of the wearer inasmuch as the band 80 goes under the occipital bone of the skull and pulls the apparatus upward in the direction 86, as shown in FIGURE 2, and firmly holds the edge 44 of the wall 42 against the cap 19 and forms a firm seal therewith. Sparks, accordingly, are readily shucked off from the cap and head and eye region of the wearer, while apparatuses that surround the head of the wearer and provide a shield which goes backward only invite the ingress of the sparks to the unprotected eyes of the welder. The apparatus of this invention avoids this situation.

Inasmuch as the apparatus is extremely light, it is very cool and serves excellently to keep the dust out of the eyes. The mirror finish avoids the heating of the apparatus due to radiation and the ready movement of this apparatus to take it off as needed permits replacement by a cooler apparatus under situations where the apparatus would get hot without requiring any particular cooling apparatus.

The plastic of which the material is made is methyl methacrylate which is an electrical insulator and does not flame. Air space 85 between the face of the wearer 18 allows for complete ventilation. The probability of sparks which affect the welder are those which go up in the air and come down; they come down on the welder's cap and on wall 42. Inasmuch as the element 42 insulates by its insulating characteristics, also by its bulk, and also by its spacing from the head of the wearer, the wearer is protected. The light fabric cap worn by a welder is readily replaced when worn out.

Although in accordance with the provision of the patent statutes, particular preferred embodiments of this invention have been described and the principles of the invention have been described in the best mode in which it is now contemplated applying such principles, it will be understood that the operations, constructions and compositions shown and described are merely illustrative and that my invention is not limited thereto and, accordingly, alterations and modifications which readily suggest themselves to persons skilled in the art without departing from the true spirit of the disclosure hereinabove are intended to be included in the scope of the annexed claims.

I claim:

1. A helmet for a welder to be worn on the head of said welder, said helmet comprising
   a first imperforate rigid wall opaque to the light rays emanating from a welding arc, said wall being formed of an electrically insulating material having a smooth, reflective outer surface and a dull inner surface and an aperture in said first wall, and a second rigid imperforate opaque wall fixed at an angle to said first wall and formed of an electrically insulating material having a smooth, reflective outer surface and a dull, interior inner surface, first means firmly and permanently joining said second plate and said first plate to each other at a light-tight joint,
   a rigid hollow conduit structure on the rear surface of said first wall and firmly attached thereto, said structure being firmly attached to the inner surface of said second wall, and said structure comprising rigid and imperforate top, bottom and side walls each firmly joined to each other with light-tight joints, second means firmly attaching said first wall to said rigid structure with light-tight joints therebetween, third means firmly and rigidly attaching said second wall to a side of said conduit structure, a filter glass and a protective sheet for said filter glass at the forward end of said rigid structure, fourth means urging said glasses toward and being held by the inner portion of said orifice,
   said rigid conduit structure adapted to extend between said first plate and the head of the welder wearing the apparatus, the upper wall having a rear edge smoothly curved concave to the rear from near to one edge thereof to near the other edge thereof and adapted to fit the forehead of the wearer, the lower wall having lateral rear edge portions each of which is smoothly curved concave to the rear and adapted to fit the cheekbone of said wearer and said rear edge of said lower wall provided with a central curved portion concave to the rear and of lesser radius of curvature than the radius of curavture of said lateral portions of the lower wall rear edge and adjacent thereto and adapted to provide an aperture for the nose of the wearer, the rear of the first wall being spaced away from the front portion of said central curved portion and adapted to hold the rear of said first wall spaced away from the nose of said wearer, said second wall being spaced away from the rigid hollow conduit structure by said third means and adapted to space away said second plate from the ear of said wearer, resilient means adapted to extend from the rear of said rigid structure about the occipital structure of the skull of the wearer to firmly hold said apparatus to said wearer, with
   an empty space between the face of the wearer and said first and second walls, said space being open at its bottom, its top and at one side, said first plate adapted to extend from the head of the wearer to below his chin.

2. Apparatus as in claim 1 wherein said first and second walls are made of an electrically insulating material and have a white and radiation-reflective outer surface and a dull, black radiation-absorptive, inner surface.

3. Apparatus as in claim 2 wherein the walls each have a layer of insulating material with a radiation-absorptive surface on the interior surface thereof and firmly attached thereto.

4. Apparatus as in claim 1 wherein removable springs urge said window elements into place, said window elements and said spring elements being removable from said rigid structure.

5. Apparatus as in claim 2 wherein the rear wall of said first wall is adapted to be spaced away between one and two inches from the nose of the wearer and the side plate is adapted to be spaced away approximately one inch from the ear of said wearer.

References Cited by the Examiner
UNITED STATES PATENTS

| | | | |
|---|---|---|---|
| 1,861,797 | 6/1932 | Holt | 2—8 |
| 2,050,939 | 8/1936 | Fairfield | 2—8 |
| 2,086,208 | 7/1937 | Brekelbaum | 2—8 |
| 2,411,224 | 11/1946 | O'Reilly | 2—8 |

FOREIGN PATENTS

| | | |
|---|---|---|
| 959,041 | 5/1964 | Great Britain. |

FRANK J. COHEN, *Primary Examiner.*

JORDAN FRANKLIN, *Examiner.*

J. R. BOLER, *Assistant Examiner.*